United States Patent
Tsuchiya

(10) Patent No.: US 9,541,891 B2
(45) Date of Patent: Jan. 10, 2017

(54) IMAGE FORMING APPARATUS

(71) Applicant: KYOCERA Document Solutions Inc., Osaka (JP)

(72) Inventor: Hiroaki Tsuchiya, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/031,995

(22) PCT Filed: Apr. 28, 2015

(86) PCT No.: PCT/JP2015/062876
§ 371 (c)(1),
(2) Date: Apr. 25, 2016

(87) PCT Pub. No.: WO2015/182324
PCT Pub. Date: Dec. 3, 2015

(65) Prior Publication Data
US 2016/0274528 A1    Sep. 22, 2016

(30) Foreign Application Priority Data
May 29, 2014 (JP) .................. 2014-110993

(51) Int. Cl.
*G03G 15/00* (2006.01)
*G03G 21/16* (2006.01)
(Continued)

(52) U.S. Cl.
CPC ........... *G03G 21/1604* (2013.01); *B41J 29/00* (2013.01); *B41J 29/42* (2013.01); *G03G 15/5016* (2013.01); *H04N 1/00* (2013.01)

(58) Field of Classification Search
USPC ................ 399/75, 79–81, 107, 110, 114
See application file for complete search history.

(56) References Cited

U.S. PATENT DOCUMENTS 5,311,248 A * 5/1994 Iwata .................. G03G 15/605
                                                       355/61
7,062,197 B2 * 6/2006 Kunugi ............. G03G 15/5016
                                                      399/107
(Continued)

FOREIGN PATENT DOCUMENTS

| JP | 2008-087877 A | 4/2008 |
| JP | 2013-214017 A | 10/2013 |
| JP | 2013-239444 A | 11/2013 |

OTHER PUBLICATIONS

International Search Report and Written Opinion; issued in PCT/JP2015/062876; mailed Jul. 14, 2015.

*Primary Examiner* — Hoan Tran
(74) *Attorney, Agent, or Firm* — Studebaker & Brackett PC

(57) ABSTRACT

A printer (100) includes a casing (200), an operation section (6), a light emitting section (61), a cover (60), and a pressing member (62). The operation section (6) includes a reference surface (201B), an LCD panel (204) disposed along the reference surface (201B) and displaying predetermined information, and operation keys (202) disposed to protrude though the reference surface (201B). The light emitting section (61) is disposed adjacent to the operation section (6) and emits light based on predetermined notification information. The cover (60) covers the LCD panel (204) and the operation keys (202). The pressing member (62) presses the cover (60) and supports the light emitting section (61).

8 Claims, 10 Drawing Sheets

(51) Int. Cl.
*B41J 29/00* (2006.01)
*B41J 29/42* (2006.01)
*H04N 1/00* (2006.01)

(56) References Cited

U.S. PATENT DOCUMENTS

2009/0220268 A1* 9/2009 Ito ...................... G03G 15/5016
399/81
2013/0266335 A1* 10/2013 Miyagawa ................ F21V 9/00
399/81

* cited by examiner

IMAGE FORMING APPARATUS

TECHNICAL FIELD

The present invention relates to image forming apparatuses for forming images on sheets.

BACKGROUND ART

An image forming apparatus disclosed in Patent Literature 1 is one of commonly known image forming apparatuses for forming images on sheets. The image forming apparatus has an apparatus body in which an image forming section is provided. The apparatus body is provided with an operation section that includes operation keys for user operation and a display panel. The operation section includes an operation sheet that is detachably attached thereto. The operation sheet has openings through which the display panel and the operation keys are exposed and also has printed information pertaining to the various keys. Another known image forming apparatus includes a light emitting section disposed near an operation section to indicate an operation state of the image forming apparatus.

CITATION LIST

[Patent Literature]
[Patent Literature 1]
Japanese Patent Application Laid-Open Publication No. 2008-87877

SUMMARY OF INVENTION

Technical Problem

Patent Literature 1 discloses that the entire operation sheet of the operation section is exposed to the outside. The operation sheet and the display section are therefore susceptible to dirt. In addition to this problem, the light emitting section may become dirty over time with use of the image forming apparatus, leading to decreased visibility of an operation state of the image forming apparatus.

The present invention is made in view of the problems noted above and aims to provide an image forming apparatus that allows easy cleaning of an operation section and a light emitting section while also restricting dirtying of the operation section.

Solution to Problem

An image forming apparatus according to one aspect of the present invention is for image formation on a sheet. The image forming apparatus includes an apparatus body, an image forming section, an operation section, a light emitting section, a cover member, and a pressing member. The image forming section is disposed in the apparatus body and forms an image on a sheet. The operation section is disposed on an exterior of the apparatus body and includes a reference surface. The operation section includes either or both of a display section that is disposed along the reference surface and displays predetermined information and an operation key that is disposed to protrude though the reference surface. The light emitting section is disposed adjacent to the operation section and emits light according to predetermined notification information. The cover member is disposed opposite to the reference surface so as to cover either or both of a perimeter of the display section and a perimeter of the operation key. The pressing member is attachable to and detachable from the apparatus body. The pressing member includes at least one supporting portion and a pressing portion. The at least one supporting portion supports the light emitting section such that a part of the light emitting section is exposed externally to the apparatus body. The pressing portion presses the cover member against the reference surface.

According to this configuration, the cover member is disposed opposite to the reference surface so as to cover a perimeter of the display section or a perimeter of the operation key. This restricts dirtying of the perimeter of the display section or the perimeter of the operation key. The pressing member has a function of pressing the cover member and a function of supporting the light emitting section. Detaching the pressing member facilitates cleaning of the interior of the cover member and part of the light emitting section.

In a preferable example of the configuration described above, the apparatus body has a wall surface and the reference surface that is part of the wall surface, the reference surface being a recessed surface parallel to the wall surface. The light emitting section extends through the reference surface and protrudes further outward from the apparatus body than the wall surface. The supporting portion of the pressing member supports the light emitting section in a region in which the light emitting section protrudes beyond the reference surface.

According to this configuration, the light emitting section is disposed to protrude beyond the wall surface of the apparatus body. This ensures that the light emitting section is readily visible from the outside of the apparatus body and that the predetermined notification information is readily confirmed. In addition, with the supporting portion supporting the light emitting section at a part protruding beyond the reference surface, breakage of the light emitting section is prevented.

In a preferable example of the configuration described above, the light emitting section includes: at least one light emitting element disposed further inward in the apparatus body than the reference surface; and at least one light guide that is disposed opposite to the at least one light emitting element and protrudes further outward of the apparatus body than the wall surface through the reference surface.

According to this configuration, the light emitting element is disposed further inward in the apparatus body than the reference surface and, as a result, application of strong external force to the light emitting element is prevented. In addition, light emitted from the light emitting element is guided through the light guide to further outward than the wall surface of the apparatus body.

In a preferable example of the configuration described above, the at least one light emitting element comprises a plurality of light emitting elements that are spaced apart in a first direction along the reference surface, and the at least one light guide comprises a plurality of light guides that are spaced apart in the first direction. The at least one supporting portion of the pressing member comprises a plurality of supporting portions that are spaced apart in the first direction, the supporting portions being cutaway portions for inserting the respective light guides therethrough.

According to this configuration, a plurality of light emitting elements and a plurality of light guides are provided. This enables different pieces of information to be conveyed through the colors of light and the number of light emitting points. In addition, with the light guides inserted through the cutaway portions formed in the pressing member, the light guides are stably supported.

In a preferable example of the configuration described above, the cover member has a substantially rectangular shape having an edge extending in the first direction. The pressing portion of the pressing member presses the edge of the cover member at an opposite side of the pressing member, in terms of a second direction intersecting the first direction, to a side of the pressing member on which the cutaway portions are located.

According to this configuration, the pressing member supports the light guides and presses the cover member at opposite sides of the pressing member in terms of the second direction.

In a preferable example of the configuration described above, the operation section at least includes the display section. The cover member is formed from a transparent member and disposed to cover the display section.

According to this configuration, the cover member being formed from a transparent member provides excellent visibility of information displayed on the display section. In addition, the display section is protected from dirt.

In a preferable example of the configuration described above, the operation section at least includes the operation key. The cover member has an operation-key opening through which the operation key is inserted and exposed.

According to this configuration, the cover member protected against ingress of dust or foreign matter into a portion around the operation key.

In a preferable example of the configuration described above, the operation section includes an information sheet that is disposed between the reference surface and the cover member and on which operation information pertaining to the operation key is indicated.

According to this configuration, the operation information indicated on the display sheet facilitates operation of the operation keys. In addition, the cover member protects the information sheet from dirt.

Advantageous Effects of Invention

The present invention provides an image forming apparatus that allows easy cleaning of an operation section and a light emitting section while also restricting dirtying of the operation section.

DESCRIPTION OF EMBODIMENTS

Figure 1:
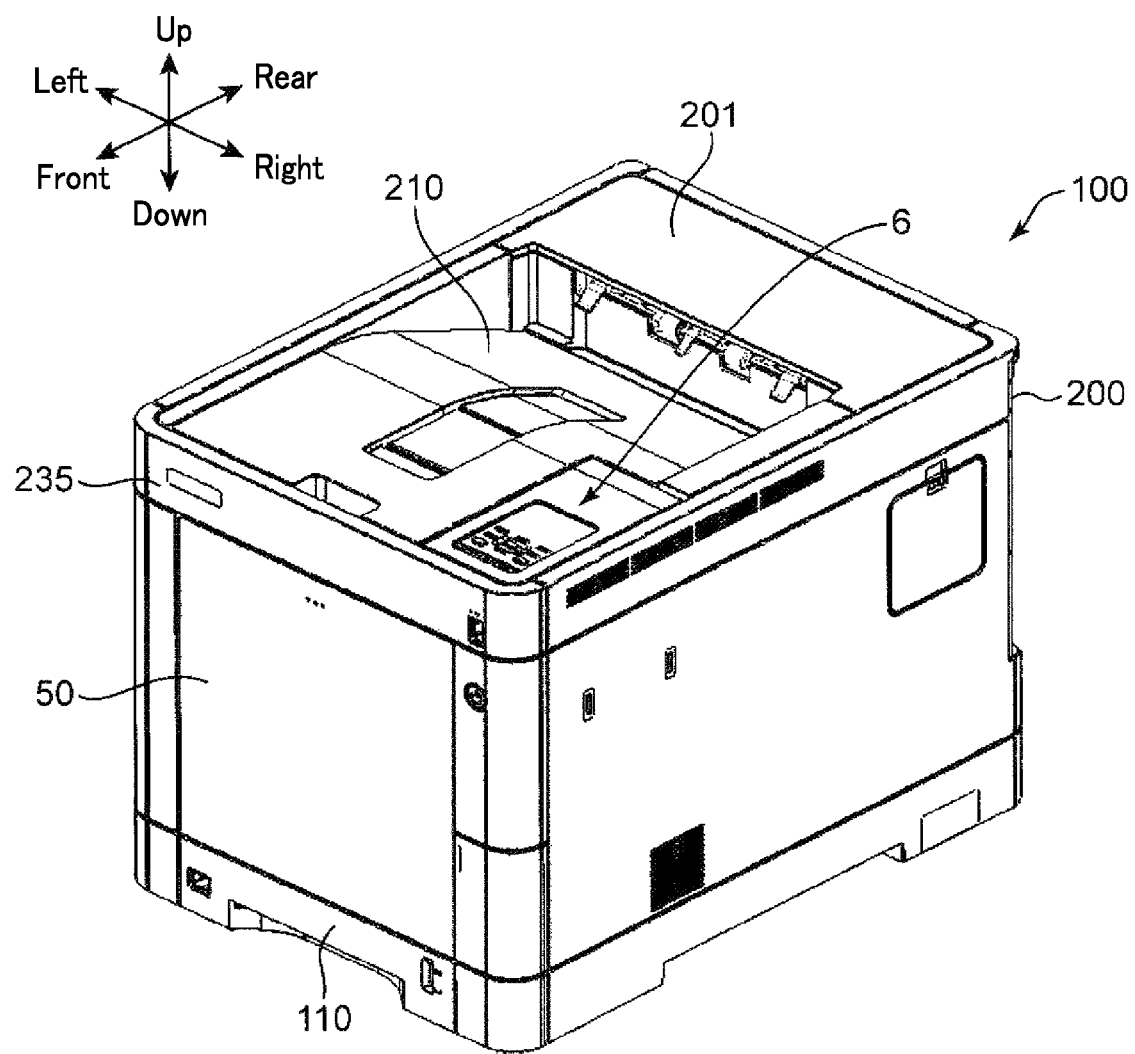
FIG. 1 is a perspective view showing an image forming apparatus according to an embodiment of the present invention.
Figure 2:
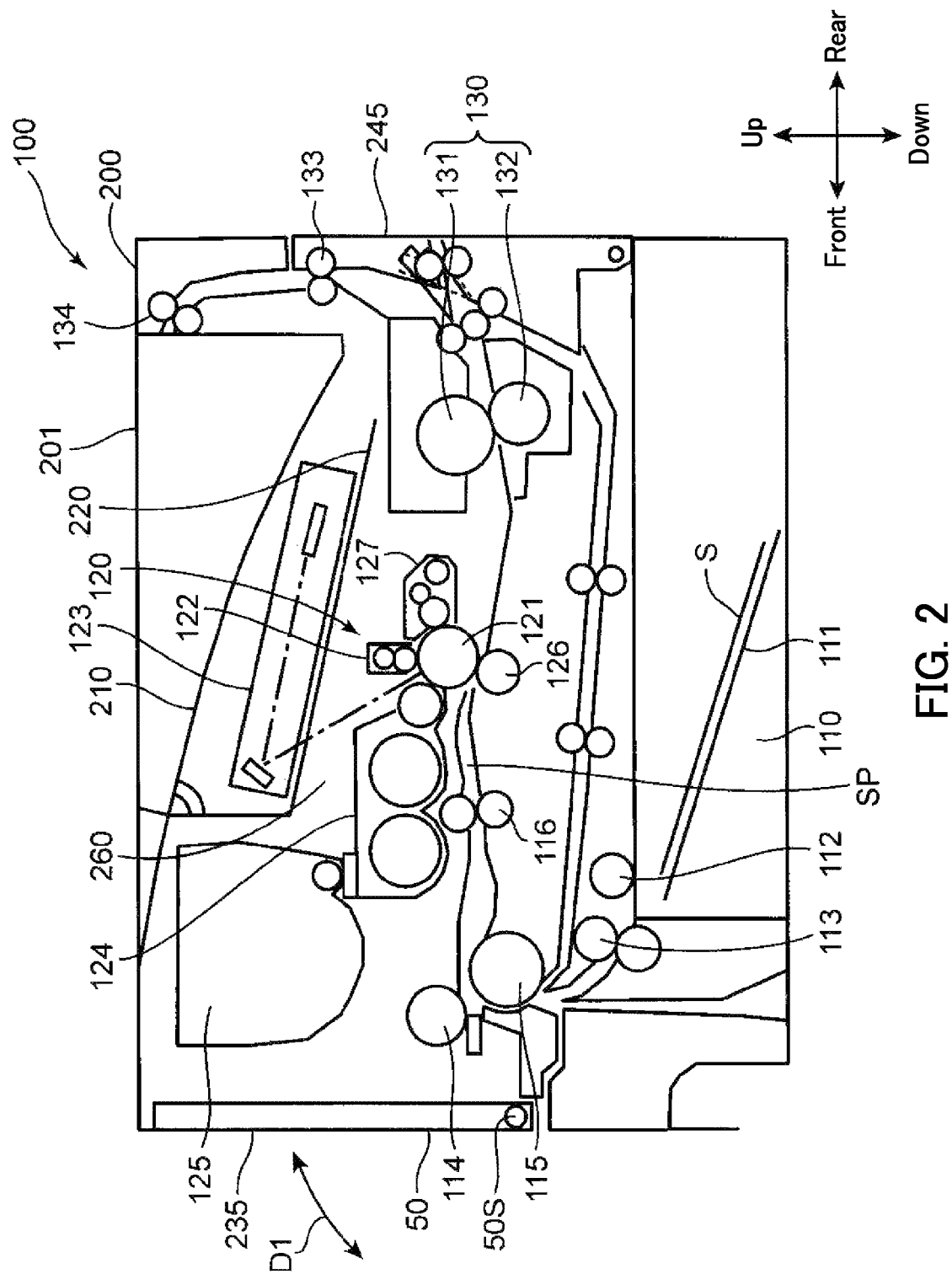
FIG. 2 is a sectional view schematically showing internal structure of the image forming apparatus according to the embodiment of the present invention.

The following describes an embodiment of the present invention with reference to the accompanying drawings. FIG. 1 is a perspective view showing a printer 100 (image forming apparatus) according to the embodiment of the present invention. FIG. 2 is a sectional view schematically showing internal structure of the printer 100 shown in FIG. 1. The printer 100 shown in FIGS. 1 and 2 is a monochrome printer as an example of the image forming apparatus. In another embodiment, the image forming apparatus may be a color printer, a facsimile machine, a multifunction peripheral that functions as a color printer and a facsimile machine, or any other apparatus that forms toner images on sheets. Terms indicating directions such as "up", "down", "front", "rear", "left", and "right" are simply used in order to clarify explanation and are not intended to limit the principles of the image forming apparatus.

The printer 100 includes a casing 200 (apparatus body) that houses various devices for forming an image on a sheet S. The casing 200 includes a top wall 201 (wall surface) that constitutes a top surface of the casing 200, a rear wall 245 that is upright in a rear part of the casing 200, and a front wall 235 located forward of the rear wall 245. The casing 200 encloses a body internal space 260 in which various devices are located. An internal sheet conveyance path SP for conveying a sheet S extends through the body internal space 260. The printer 100 is provided with a manual feed tray 50 that is freely openable and closable relative to the casing 200.

A paper ejection section 210 is located centrally on the top wall 201. The paper ejection section 210 has an inclined surface that is inclined downward from a front part of the top wall 201 toward a rear part of the top wall 201. A sheet S is ejected to the paper ejection section 210 by the paper ejection section 210 after an image is formed on the sheet S by an image forming section 120.

As shown in FIG. 2, the printer 100 includes a cassette 110, a pickup roller 112, a pair of first paper feed rollers 113, a second paper feed roller 114, a conveyance roller 115, a pair of registration rollers 116, and the image forming section 120. The image forming section 120 is disposed inside the casing 200 and forms an image on a sheet S.

The cassette 110 stores sheets S. The cassette 110 includes a lift plate 111 that supports the sheets S. The lift plate 111 is inclined such as to push leading edges of the sheets S upward.

The pickup roller 112 is disposed at a position corresponding to the leading edges of the sheets S pushed up by the lift plate 111 and feeds the sheets S one at a time. The pair of first paper feed rollers 113 is disposed downstream of the pickup roller 112 in terms of the conveyance direction of the sheet S and forwards the sheet S to further downstream. The second paper feed roller 114 is disposed inward (rearward) from a pivot 505 of the manual feed tray 50. The second paper feed roller 114 pulls a sheet S placed on the manual feed tray 50 into the casing 200. A user can select to use sheets S stored in the cassette 110 or sheets S placed on the manual feed tray 50.

The conveyance roller 115 conveys the sheet S forwarded by the pair of first paper feed rollers 113 or the second paper feed roller 114 to further downstream in terms of the conveyance direction of the sheet S. The pair of registration rollers 116 has a function of correcting skewing of the sheet S being conveyed. The skewing correction adjusts the position at which an image is subsequently formed on the sheet S.

The pair of registration rollers 116 feeds the sheet S to the image forming section 120 in accordance with the timing of the image formation by the image forming section 120.

The image forming section 120 includes a photosensitive drum 121, a charger 122, an exposure device 123, a developing device 124, a toner container 125, a transfer roller 126, and a cleaning device 127.

The photosensitive drum 121 has a circumferential surface on which an electrostatic latent image and a toner image conforming to the electrostatic latent image are to be formed. The charger 122 uniformly charges the circumferential surface of the photosensitive drum 121. The exposure device 123 directs laser light to the circumferential surface of the photosensitive drum 121 charged by the charger 122.

The developing device 124 supplies toner to the circumferential surface of the photosensitive drum 121 on which the electrostatic latent image is formed. The toner container 125 supplies toner to the developing device 124. Toner supplied from the developing device 124 to the photosensitive drum 121 develops (visualizes) the electrostatic latent image formed on the circumferential surface of the photosensitive drum 121.

The transfer roller 126 is disposed to rotate in contact with the circumferential surface of the photosensitive drum 121. The toner image formed on the circumferential surface of the photosensitive drum 121 is transferred to the sheet S while the sheet S that is conveyed from the pair of registration rollers 116 passes between the photosensitive drum 121 and the transfer roller 126. The cleaning device 127 removes toner remaining on the circumferential surface of the photosensitive drum 121 after the transfer of the toner image to the sheet S.

The printer 100 further includes a fixing device 130 for fixing a toner image on a sheet S, at a location downstream of the image forming section 120 in terms of the conveyance direction. The fixing device 130 includes a heating roller 131 for fusing toner on the sheet S and a pressure roller 132 for placing the sheet S into intimate contact with the heating roller 131.

The printer 100 further includes a pair of conveyance rollers 133 disposed downstream of the fixing device 130 and a pair of ejection rollers 134 disposed downstream of the pair of conveyance rollers 133. The pair of conveyance rollers 133 conveys a sheet S upward and the pair of ejection rollers 134 ejects the sheet S out from the casing 200. Sheets S ejected from the casing 200 are stacked on the paper ejection section 210.

Figure 3:
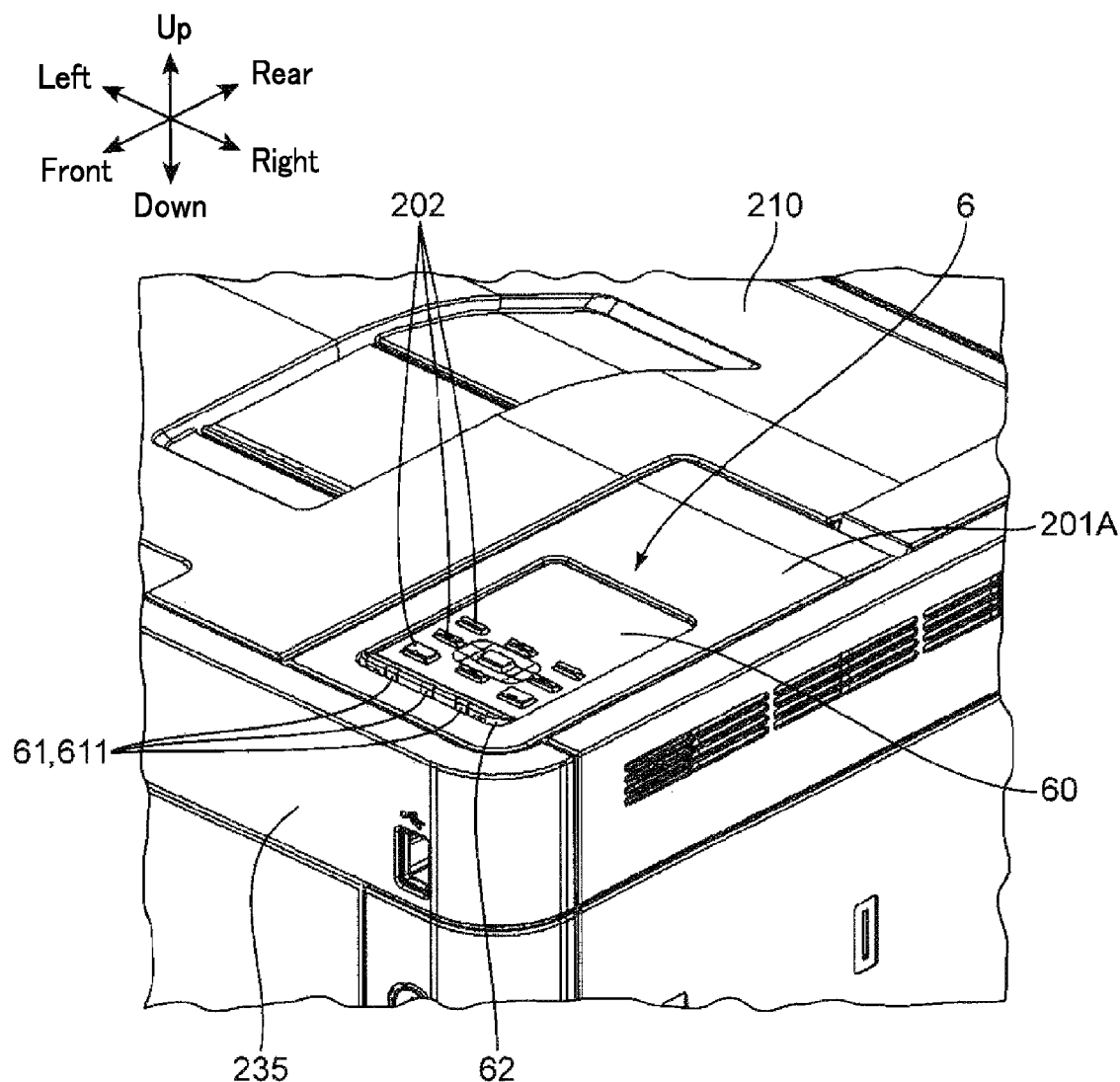
FIG. 3 is an enlarged perspective view showing an external representation of part of the image forming apparatus according to the embodiment of the present invention.
Figure 4A:
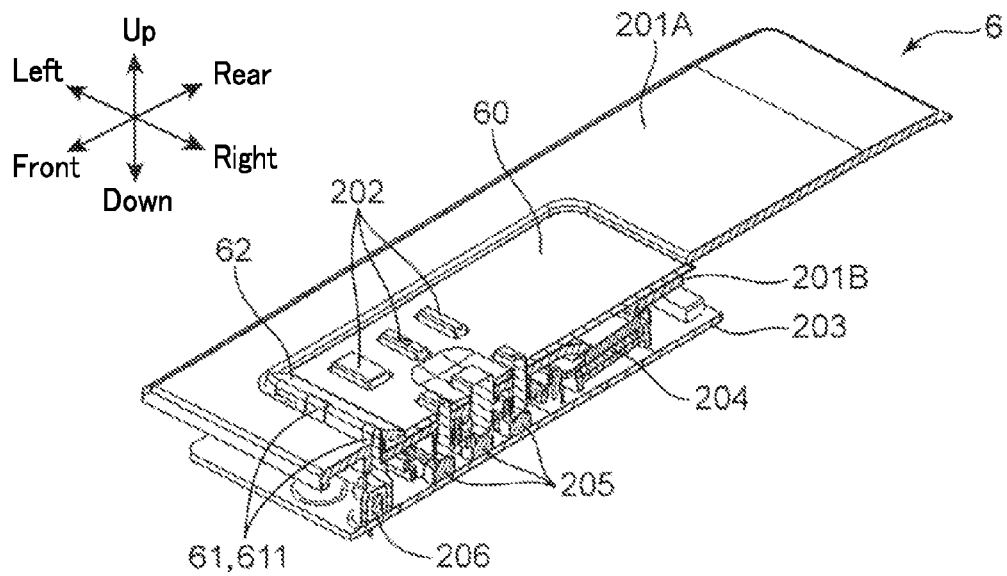
FIG. 4A is a sectional perspective view showing an operation section of the image forming apparatus according to the embodiment of the present invention.
Figure 4B:
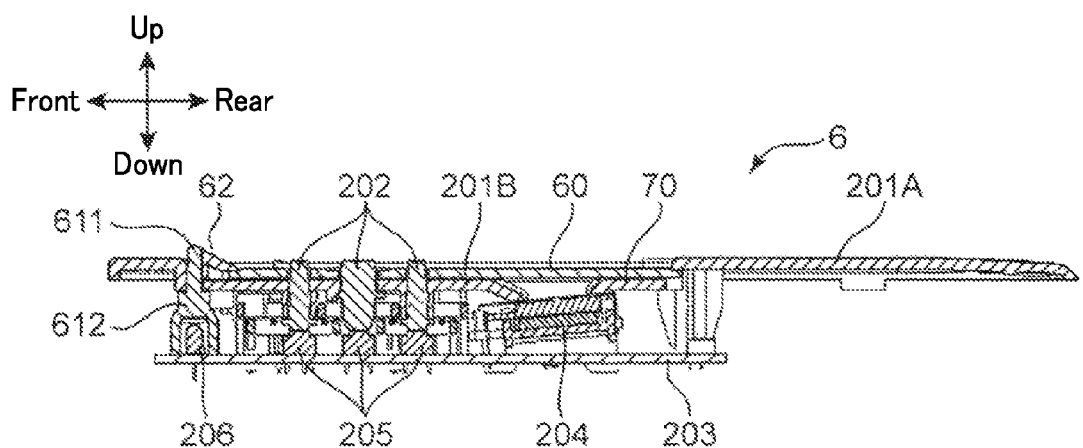
FIG. 4B is a sectional view showing the operation section of the image forming apparatus according to the embodiment of the present invention.
Figure 4C:
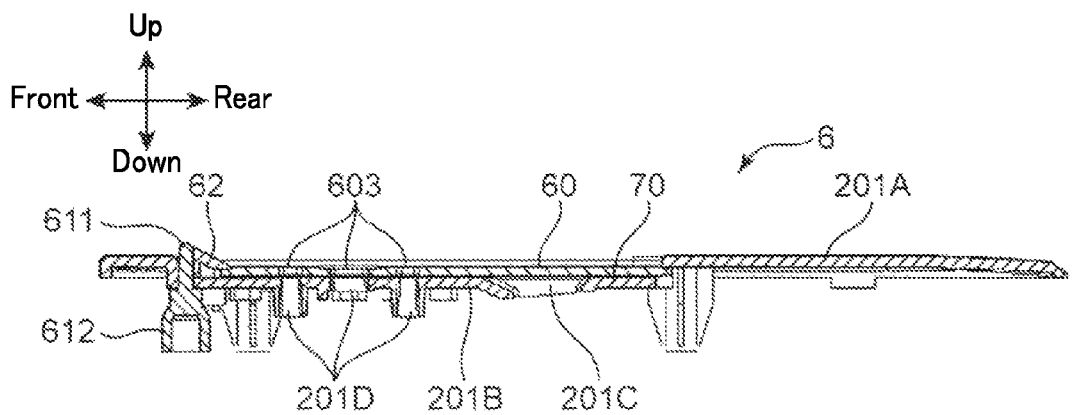
FIG. 4C is a sectional view showing part of the operation section of the image forming apparatus according to the embodiment of the present invention.
Figure 5:
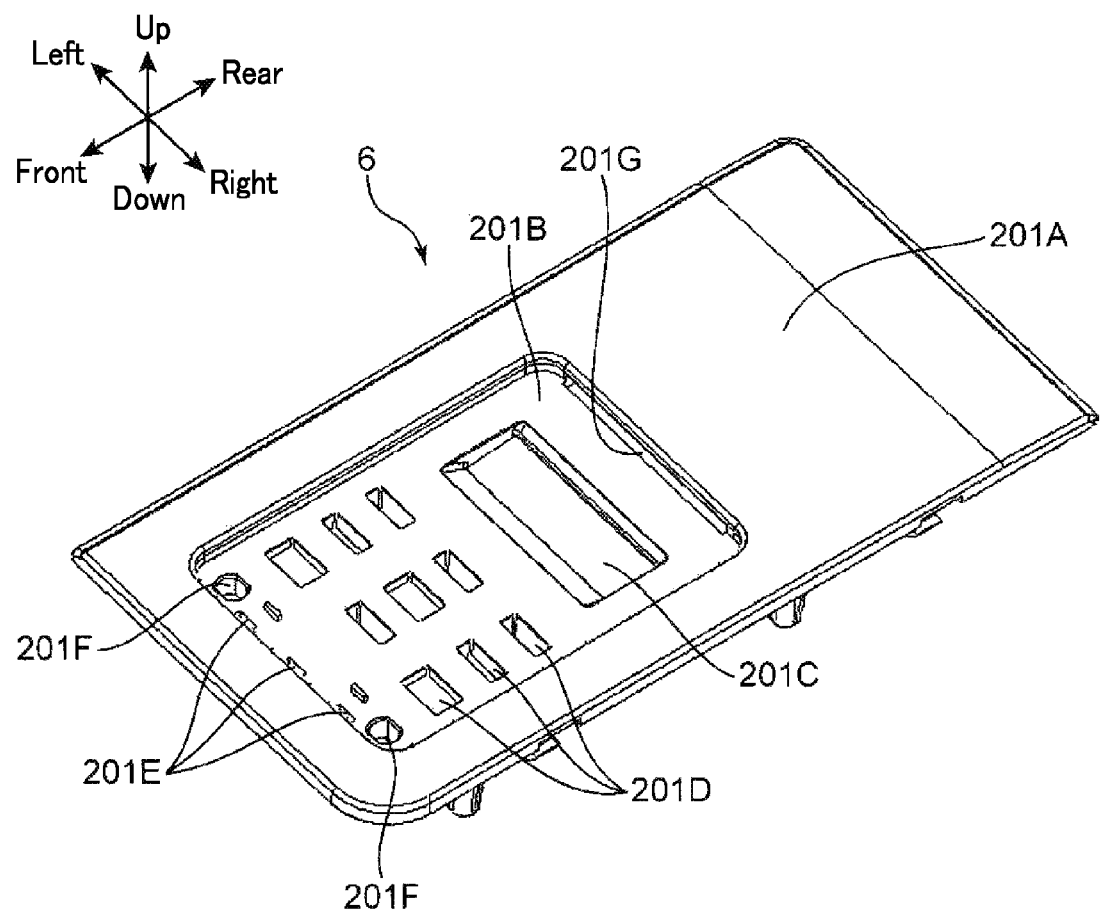
FIG. 5 is a perspective view showing part of an apparatus body in proximity to the operation section of the image forming apparatus according to the embodiment of the present invention.
Figure 6:
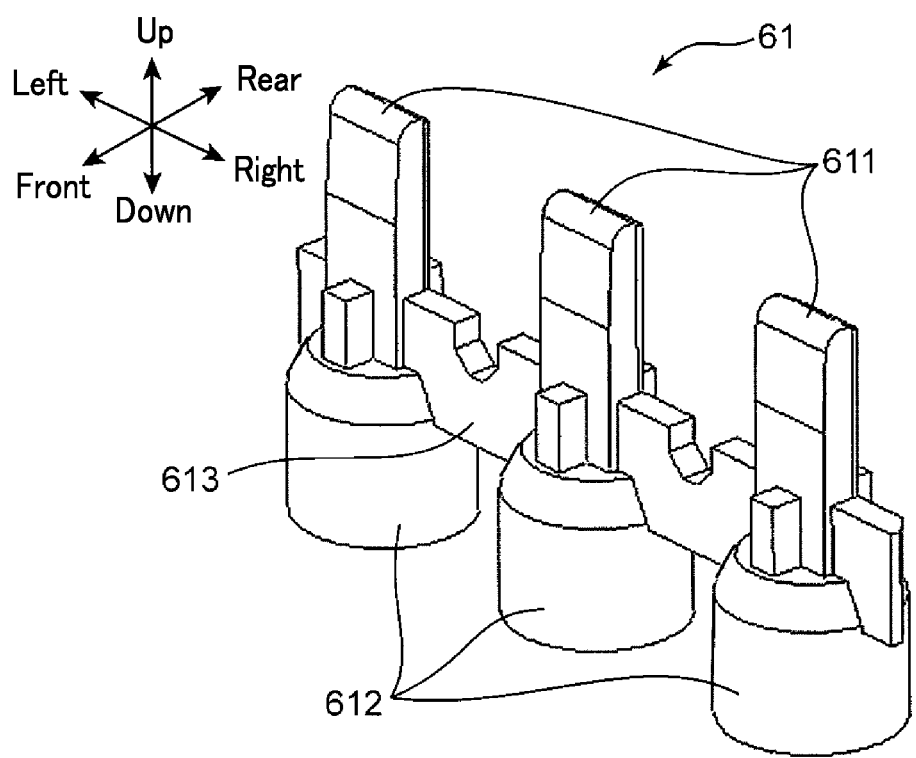
FIG. 6 is a perspective view showing a light emitting section according to the embodiment of the present invention.

FIG. 3 is an enlarged perspective view showing an external representation of part of the printer 100 according to the present embodiment. FIG. 4A is a sectional perspective view showing the operation section 6 of the printer 100. FIG. 4B is a sectional view showing the operation section 6 of the printer 100. FIG. 4C is a sectional view showing part of the operation section 6 shown in FIG. 4B. FIG. 5 is a perspective view showing part of the casing 200 in proximity to the operation section 6 (showing a top wall cover 201A). FIG. 6 is a perspective view showing the light emitting section 61 of the printer 100.

As shown in FIGS. 3 and 4A, the printer 100 includes the operation section 6. The operation section 6 is disposed on an exterior of the casing 200 and, more specifically, is disposed on the top wall cover 201A of the casing 200. The top wall cover 201A constitutes a portion corresponding to a front right corner of the top wall 201 of the casing 200. The top wall cover 201A is formed separately from the top wall 201 (casing 200) and is mounted and fixed to the top wall 201 (see FIG. 5). Through the above, the top surface of the top wall cover 201A constitutes part of the top wall 201. The top wall cover 201A has a reference surface 201B. The reference surface 201B is a part of the top surface of the top wall cover 201A (the top wall 201) and is a recessed surface parallel to the top surface of the top wall cover 201A.

The operation section 6 includes a plurality of operation keys 202, a substrate 203, an LCD panel 204 (display section), switching terminals 205, and a light emitting section 61. The operation keys 202 protrude upward through the reference surface 201B. As shown in FIG. 3, the present embodiment provides a total of nine operation keys 202 in a three-by-three array in the front-rear and right-left directions. The substrate 203 is an electric circuit board disposed in parallel to the reference surface 201B below (inward from) the reference surface 201B.

The LCD panel 204 is disposed along the reference surface 201B and displays predetermined information such as print information of the printer 100. As shown in FIG. 4B, the LCD panel 204 is disposed to have its display surface slightly inclined downward toward the front in order to improve visibility by the user. The LCD panel 204 is supported on the substrate 203 and electrically connected to the substrate 203.

The switching terminals 205 are disposed forward of the LCD panel 204 on the substrate 203. The switching terminals 205 are disposed under the respective operation keys 202, which means that nine switching terminals 205 are provided. A push of an operation key 202 by a user turns on a corresponding switching terminal 205 to generate a predetermined electrical signal on the substrate 203.

The light emitting section 61 is disposed adjacent to the front of the operation section 6 (FIGS. 4A and 4B). The light emitting section 61 emits light according to predetermined notification information. In one example, the light emitting section 61 emits light in a predetermined color upon occurrence of a paper jam or exhaustion of toner in the printer 10. As shown in FIGS. 4A and 4B, the light emitting section 61 extends upward through the reference surface 201B and protrudes further outward from the casing 200 than the top wall cover 201A (top wall 201).

The light emitting section 61 includes LEDs 206 (light emitting elements) and light guides 612. The LEDs 206 are disposed on the substrate 203 and further inward in the casing 200 than the reference surface 201B. The LEDs (three LEDs) 206 are spaced in the right-left direction (first direction along the reference surface 201B). The LEDs 206 may emit light of different colors.

As shown in FIG. 4B, each light guide 612 is disposed opposite to a corresponding LED 206 to surround the LED 206. The light guide 612 extends through the reference surface 201B and protrudes further outward from the casing 200 than the top wall cover 201A. As shown in FIG. 6, three light guides 612 are provided one to one with the three LEDs 206. Similarly to the LEDs 612, the plurality of (three) light guides 612 are spaced in the right-left direction (first direction along the reference surface 201B). The three light guides 612 are connected to one another by a connecting section 613 that is integrally formed with the light guides 612. An upper tip of each of the light guides 612 is a light emitting point 611 that can be visually recognized by a user. As described above, with the provision of the plurality of LEDs 206 and the plurality of light guides 612, the present embodiment can convey various apparatus information to users through the colors of light and the number of light emitting points.

As shown in FIG. 5, the top wall cover 201A has, in addition to the reference surface 201B described above, a panel opening 201C, switch openings 201D, light guide openings 201E, pressing member mounting sections 201F, and a cover mounting opening 201G.

The panel opening 201C is a rectangular opening formed in a rear part of the reference surface 201B. The panel opening 201C is located above the LCD panel 204 (FIGS. 4B and 4C). The LCD panel 204 is exposed externally to the casing 200 through the panel opening 201C. The switch openings 201D are nine openings formed forward of the panel opening 201C. The operation keys 202 described above are inserted through the switch openings 201D. The light guide openings 201E are three openings formed each at a location forward of the switch openings 201D. The light guides 612 described above are inserted through the light guide openings 201E. The pressing member mounting sections 201F are openings formed as a pair, one of which to the right and the other to the left of the light guide openings 201E. The pressing member mounting sections 201F is for mounting cylindrical portions 623 of a pressing member 62, which will be described later. The cover mounting opening 201G is an elongated narrow opening formed, along a front edge of the reference surface 201B, in a stepped part between the top surface of the top wall cover 201A and the reference surface 201B. The cover mounting opening 201G is for insertion of a mounting portion 601 of a cover 60, which will be described later.

Figure 7:
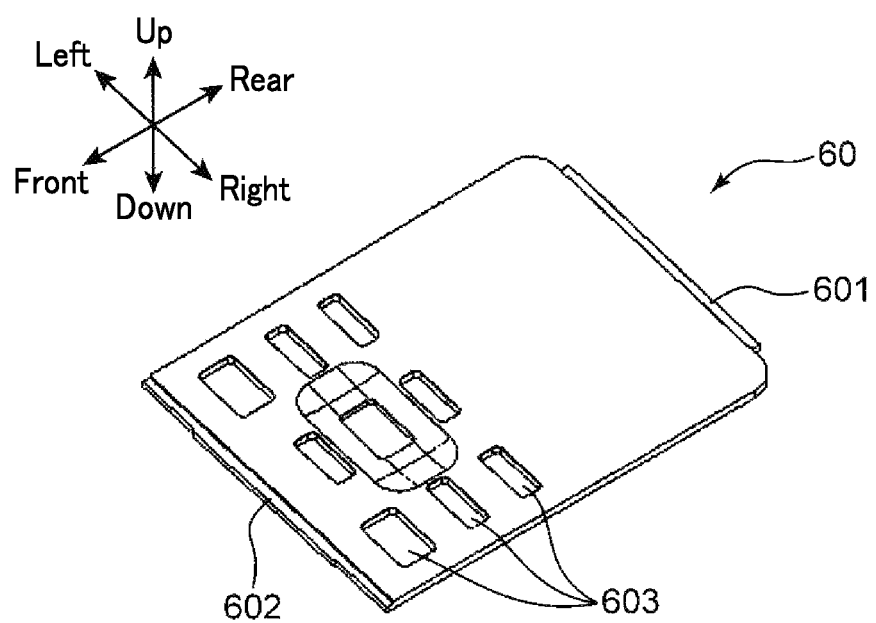
FIG. 7 is a perspective view showing a cover member of the image forming apparatus according to the embodiment of the present invention.
Figure 8A:
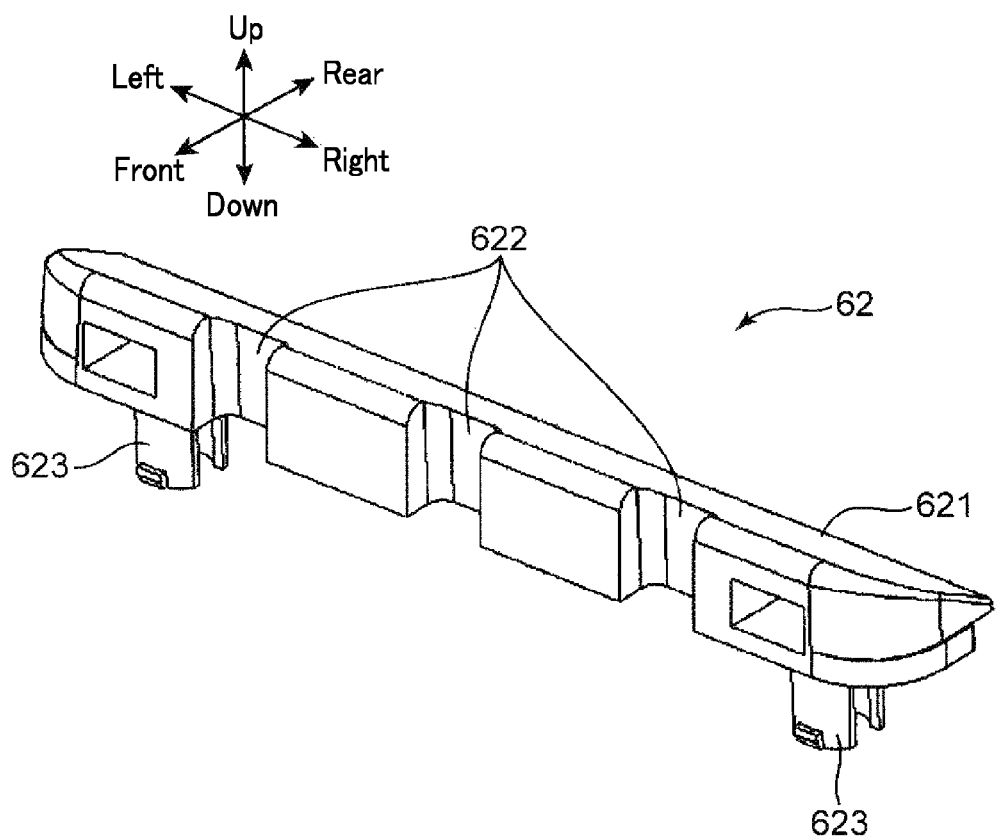
FIG. 8A is a perspective view showing a pressing member according to the embodiment of the present invention.
Figure 8B:
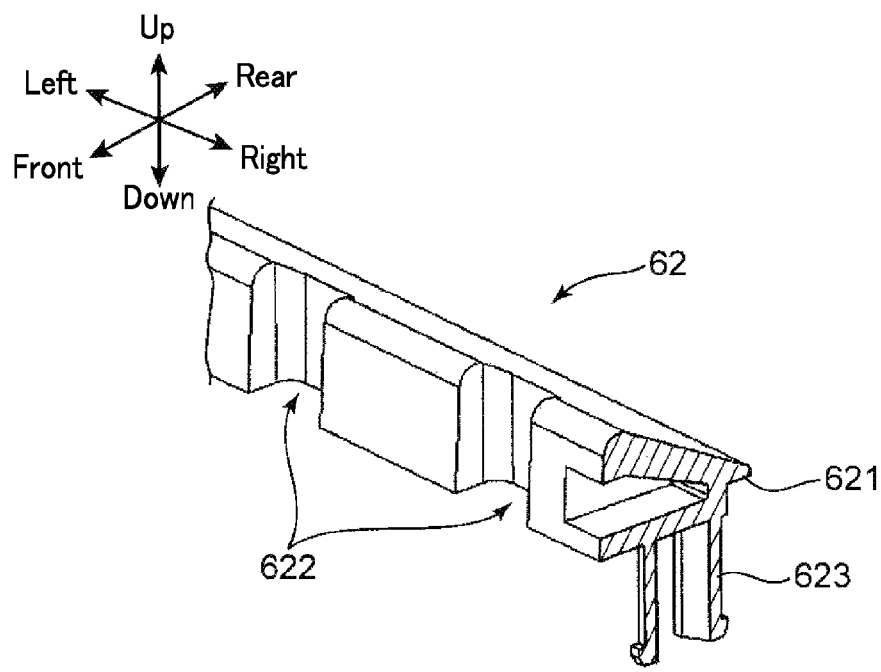
FIG. 8B is an enlarged sectional perspective view showing part of the pressing member according to the embodiment of the present invention.

The printer 100 additionally includes the cover 60 (cover member), a display sheet 70 (FIG. 4B) (information sheet), and the pressing member 62. FIG. 7 is a perspective view showing the cover 60 of the printer 100. FIG. 8A is a perspective view showing the pressing member 62. FIG. 8B is an enlarged sectional perspective view showing part of the pressing member 62.

The cover 60 is disposed opposite to the reference surface 201B so as to cover the perimeters of the LCD panel 204 and the operation keys 202. The cover 60 has a substantially rectangular shape having an edge extending in the right-left direction. The cover 60 according to the present embodiment is a transparent member, which provides users with excellent visibility of information displayed on the LCD panel 204. The cover 60 so mounted protects the perimeters of the LCD panel 204 and the operation keys 202 from dirt. As shown in FIG. 7, the cover 60 includes the mounting portion 601, a pressed portion 602, and cover openings 603 (operation-key openings).

The mounting portion 601 is a tab projecting from the rear edge of the cover 60. The mounting portion 601 is designed to be thinner than the cover 60 in the up-down direction. The pressed portion 602 is a tab projecting from the front edge of the cover 60. The pressed portion 602 is also designed to be thinner than the cover 60 in the up-down direction. The mounting portion 601 and the pressed portion 602 have lower surfaces that are coplanar with the lower surface of the cover 60.

As the cover openings 603, nine openings are formed in a front part of the cover 60. The cover openings 603 are located opposite to the switch openings 201D shown in FIG. 5. Each operation key 202 is inserted through a corresponding switch opening 201D and a corresponding cover opening 603 so that the operation key 202 is exposed on the operation section 6. This configuration allows the user to operate the operation keys 202 with the cover 60 mounted on the operation section 6.

The display sheet 70 is a sheet of paper or resin disposed between the reference surface 201B and the cover 60. The display sheet 70 has a shape substantially identical to the cover 60 shown in FIG. 7 and has openings corresponding to the cover openings 603. For ensuring that information displayed on the LCD panel 204 is visible from outside the operation section 6, the display sheet 70 additionally has an opening (not shown) corresponding to the panel opening 201C shown in FIG. 5. The display sheet 70 indicates operation information pertaining to the operation keys. In one example, the display sheet 70 includes printed key numbers associated with the operation keys 202. The operation information indicated on the display sheet 70 facilitates operation of the operation key 202. The operation information is provided in the language of the country (shipping destination) in which the printer 100 is to be used. The display sheet 70 is covered by the cover 60 from above and thus protected from dirt.

Figure 9A:
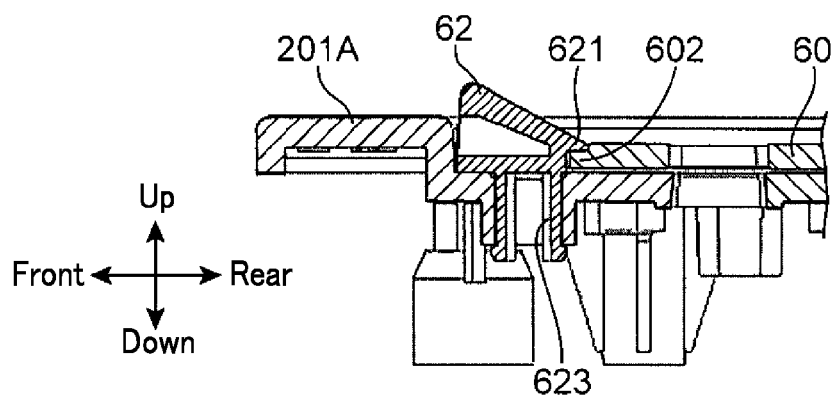
FIG. 9A is a sectional view showing part of the operation section of the image forming apparatus according to the embodiment of the present invention.
Figure 9B:
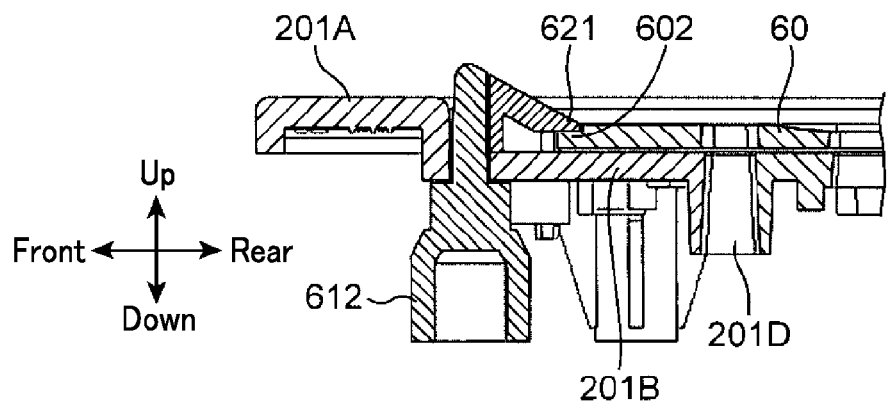
FIG. 9B is a sectional view showing part of the operation section of the image forming apparatus according to the embodiment of the present invention.
Figure 9C:
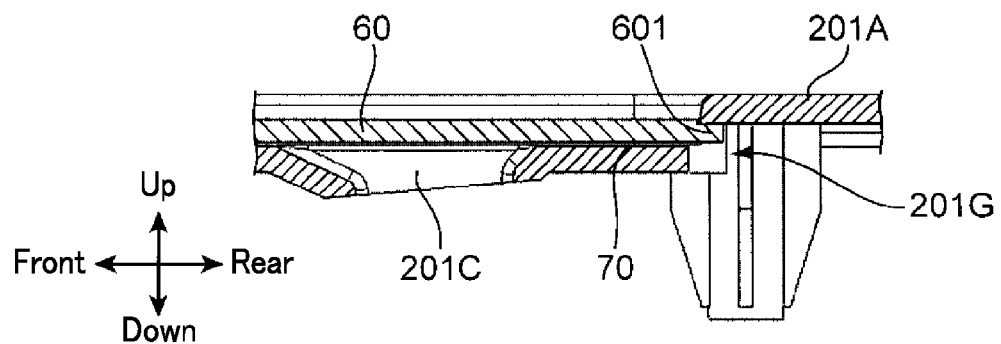
FIG. 9C is a sectional view showing part of the operation section of the image forming apparatus according to the embodiment of the present invention.
Figure 10A:
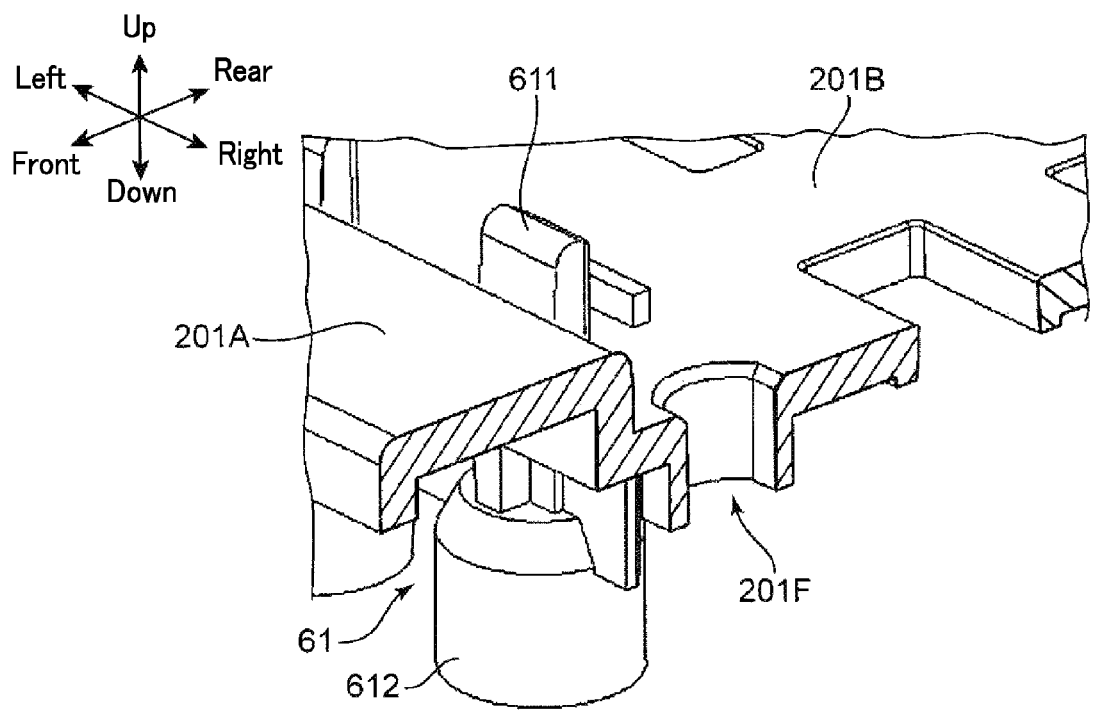
FIG. 10A is a sectional perspective view showing part of the operation section of the image forming apparatus according to the embodiment of the present invention.
Figure 10B:
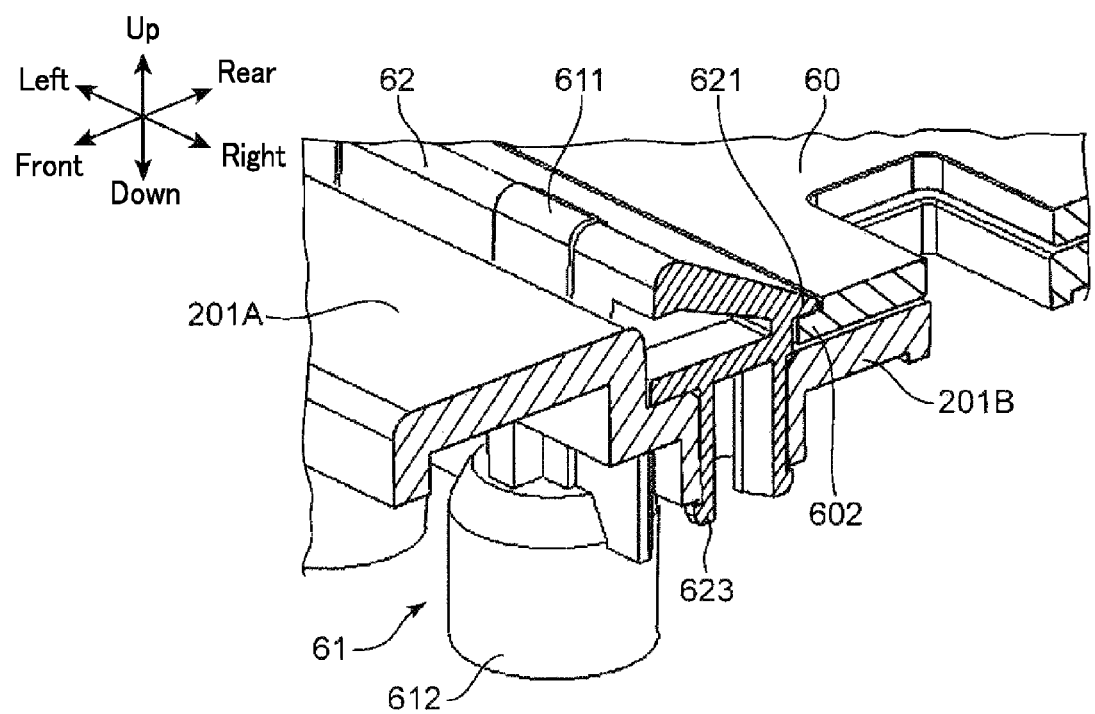
FIG. 10B is a sectional perspective view showing part of the operation section of the image forming apparatus according to the embodiment of the present invention.

FIGS. 9A and 9B are each a sectional view showing part (front part) of the operation section 6 of the printer 100 according to the present embodiment. FIG. 9A is a sectional view cutting across one of the cylindrical portions 623 of the pressing member 62. FIG. 9B is a sectional view taken to intersect one of the light guides 612 of the light emitting section 61. FIG. 9C is a sectional view showing part (rear part) of the operation section 6. FIGS. 10A and 10B are each a sectional perspective view showing part of the operation section 6. FIG. 10A shows the operation section 6 with the cover 60 and the pressing member 62 detached, whereas FIG. 10B shows the operation section 6 with the cover 60 and the pressing member 62 attached. FIGS. 10A and 10B omit illustration of the operation keys 202.

The pressing member 62 is located forward of the operation section 6 (FIGS. 3, 4A, and 4B). As shown in FIG. 8A, the pressing member 62 is a member made from resin and extends in the right-left direction. The pressing member 62 includes a pressing portion 621, cutaway portions 622 (support portions), and the cylindrical portions 623. The pressing member 62 is attachable to and detachable from the top wall cover 201A of the casing 200. As shown in FIG. 9A, the pressing member 62 is substantially triangular in a cross section taken along a plane containing the up-down direction and the front-rear direction.

The pressing portion 621 constitutes the rear part of the pressing member 62. The pressing portion 621 (FIG. 8B) functions to press the cover 60 against the reference surface 201B.

Each cutaway portion 622 extends through the pressing member 62 in the up-down direction. A plurality of (three) cutaway portions 622 are spaced in the right-left direction (first direction), and the light guides 612 of the light emitting section 61 are inserted through the respective cutaway portions 622. As a result, each cutaway portion 622 functions to support a corresponding light emitting section 61 in a manner that a portion of the light emitting section 61 is exposed externally to the casing 200. In particular, the cutaway portion 622 supports the light guide 612 of the light emitting section 61 in a region in which the light guide protrudes upward beyond the reference surface 201B.

As shown in FIG. 10A, with the cover 60 and the pressing member 62 removed from the operation section 6, an upper part of each of the three light guides 612 is exposed. In this state, the light guides 612 may be susceptible to breakage by accidental contact by a user. In addition, dust or foreign matter accumulates on the top surface of the LCD panel 204 or around the operation keys 202, which decreases ease of operation of the operation section 6. In addition, the display sheet 70 (FIG. 4B) disposed above the reference surface 201B may become dirty, which decreases ease of operation of the operation section 6. To address these possibilities, the operation section 6 is provided with the cover 60 as described above. The cover 60 is easily attached by pressing the mounting portion 601 toward the rear until the mounting portion 601 is inserted into the cover mounting opening 201G of the top wall cover 201A as shown in FIG. 9C.

Then, the pressing member 62 is attached to the operation section 6 such as to change from the state shown in FIG. 10A to the state shown in FIG. 10B. More specifically, the cylindrical portions 623 of the pressing member 62 are fitted into the pair of pressing member mounting sections 201F formed in the front part of the top wall cover 201A. Each cylindrical portion 623 has flanged parts at the end thereof (see FIG. 8A). As shown in FIG. 10B, the flanged parts engage with the bottom edge of the pressing member mounting section 201F to secure the pressing member 62. Note that the cylindrical portions 623 are easily disengaged from the pressing member mounting sections 201F when the pressing member 62 is lifted upward by the user.

For attaching the pressing member 62 to the top wall cover 201A, the respective light guides 612 are inserted into the three cutaway portions 622 of the pressing member 62. Consequently, the light emitting points 611 of the light emitting section 61 are exposed above the top wall cover 201A as shown in FIG. 10B.

The pressing portion 621 of the pressing member 62 presses the pressed portion 602 (one edge) of the cover 60 at an opposite side of the pressing member 62, in terms of the front-rear direction (second direction) intersecting the right-left direction (first direction), from a side on which the cutaway portions 622 are located. This ensures that the cover 60 is secured along the front edge and the rear edge, preventing accidental detachment of the cover 60.

As described above, the pressing member 62 according to the present embodiment functions to press and secure the cover 60 and also to support the light emitting section 61. In particular, the pressing member 62 supports the light guides 612 and presses the cover 60 at opposite sides of the pressing member 62 in terms of the front-rear direction. In addition, detaching the pressing member 62 from the top wall cover 201A facilitates cleaning of the interior of the cover 60 and part of the light emitting section 61 (light guides 612).

According to the present embodiment, in addition, the light guides 612 of the light emitting section 61 protrude beyond the top wall 201 of the casing 200. This ensures that the light emitting section 61 is readily visible to the user from the outside of the casing 200, which facilitates user recognition of the predetermined notification information. In addition, the cutaway portions 622 of the pressing member 62 support the light emitting section 61 in a region in which the light emitting section 61 protrudes beyond the reference surfaces 201B. This is effective to prevent breakage of the light guides 612 of the light emitting section 61. In addition, with the light guides 612 inserted through the cutaway portions 622 that are formed in the pressing member 62, the light guides 612 are stably supported. As shown in FIG. 4B, in addition, the LEDs 206 are disposed further inward in the casing 200 than the reference surfaces 201B (inset from the reference surface 201B). This prevents application of strong external force to the LEDs 206. In addition, light emitted from the LEDs 206 is guided through the light guides 612 to further outward than the top wall cover 201A of the casing 200.

According to the present embodiment, in addition, the light emitting point 611 of each light guide 612 is located above the top wall 201. This allows the user to confirm the state of the printer 100 at a distance from the printer 100. In addition, the pressing portion 621 of the pressing member 62 is constituted by a surface inclined downward toward the rear. This allows the user approaching the printer 100 from the front to promptly view the operation keys 202 and the LCD panel 204 of the operation section 6 and promptly access the operation keys 202.

The description above is given of the printer 100 (image forming apparatus) according to the embodiment of the present invention. However, the present invention is not limited to this specific embodiment, and various modified embodiments including the following may be made.

(1) The embodiment described above is directed to an example in which the operation section 6 is provided with the LCD panel 204 and the operation keys 202, which however should not be construed as limiting the present invention. The operation section 6 may be provided with only either the LCD panel 204 or the operation keys 202.

(2) The embodiment described above is directed to an example in which the operation section 6 is provided with the display sheet 70, which however should not be construed as limiting the present invention. The operation section 6 may be without the display sheet 70. The prints indicating the operation information describing the operation keys 202 may be provided on the reference surface 201B or the cover 60. The cover 60 is not limited to a transparent member and may be semi-transparent or colored.

The invention claimed is:

1. An image forming apparatus for image formation on a sheet, the image forming apparatus comprising:
   an apparatus body;
   an image forming section disposed in the apparatus body and configured to form an image on the sheet;
   an operation section that is disposed on an exterior of the apparatus body and includes a reference surface and either or both of a display section disposed along the reference surface and configured to display predetermined information and an operation key disposed to protrude though the reference surface;

a light emitting section disposed adjacent to the operation section and configured to emit light based on predetermined notification information;

a cover member disposed opposite to the reference surface so as to cover either or both of a perimeter of the display section and a perimeter of the operation key; and a pressing member attachable to and detachable from the apparatus body, wherein the pressing member includes
- at least one supporting portion configured to support the light emitting section such that a part of the light emitting section is exposed externally to the apparatus body and
- a pressing portion configured to press the cover member against the reference surface.

2. The image forming apparatus according to claim 1, wherein
the apparatus body has a wall surface and the reference surface that is a part of the wall surface, the reference surface being a recessed surface parallel to the wall surface,
the light emitting section extends through the reference surface and protrudes further outward from the apparatus body than the wall surface, and
the supporting portion of the pressing member supports the light emitting section in a region in which the light emitting section protrudes beyond the reference surface.

3. The image forming apparatus according to claim 2, wherein
the light emitting section includes
- at least one light emitting element disposed further inward in the apparatus body than the reference surface and
- at least one light guide that is disposed opposite to the light emitting element and protrudes further outward of the apparatus body than the wall surface through the reference surface.

4. The image forming apparatus according to claim 3, wherein
the at least one light emitting element comprises a plurality of light emitting elements that are spaced apart in a first direction along the reference surface, and the at least one light guide comprises a plurality of light guides that are spaced apart in the first direction, and
the at least one supporting portion of the pressing member comprises a plurality of supporting portions that are spaced apart in the first direction, the supporting portions being cutaway portions for inserting the respective light guides therethrough.

5. The image forming apparatus according to claim 4, wherein
the cover member has a substantially rectangular shape having an edge extending in the first direction, and
the pressing portion of the pressing member presses the edge of the cover member at an opposite side of the pressing member, in terms of a second direction intersecting the first direction, to a side of the pressing member on which the cutaway portions are located.

6. The image forming apparatus according to claim 1, wherein
the operation section at least includes the display section, and
the cover member is formed from a transparent member and disposed to cover the display section.

7. The image forming apparatus according to claim 1, wherein
the operation section at least includes the operation key, and
the cover member has an operation-key opening through which the operation key is inserted and exposed.

8. The image forming apparatus according to claim 7, wherein
the operation section includes an information sheet that is disposed between the reference surface and the cover member and on which operation information pertaining to the operation key is indicated.

* * * * *